United States Patent [19]

Weiblen

[11] Patent Number: 4,548,530
[45] Date of Patent: Oct. 22, 1985

[54] REBORING TOOL

[75] Inventor: Richard Weiblen, Münsingen-Dottingen, Fed. Rep. of Germany

[73] Assignee: TBT Tiefbohrtechnik GmbH & Co. KG, Dettingen, Fed. Rep. of Germany

[21] Appl. No.: 585,135

[22] Filed: Mar. 1, 1984

[30] Foreign Application Priority Data

Mar. 3, 1983 [DE] Fed. Rep. of Germany ....... 3307458

[51] Int. Cl.4 .............................................. B23D 19/10
[52] U.S. Cl. ........................................ 408/79; 29/57; 408/59
[58] Field of Search ...................... 29/57; 408/57–59, 408/79–83, 93, 94, 233

[56] References Cited

U.S. PATENT DOCUMENTS 3,430,288 4/1969 Kaiser ................................... 408/79
4,053,249 10/1977 Ness et al. ........................ 408/57 X
4,346,508 8/1982 Baumann et al. ................. 408/79 X Primary Examiner—Eugene F. Desmond
Attorney, Agent, or Firm—Peter K. Kontler

[57] ABSTRACT

A reboring tool has a two-piece carrier for a separable cutter with several cutting edges. The front shank of the carrier is threadedly connected with the rear shank which has one axial passage for admission of coolant to the range of the cutting edges. The cutter is rotatable and axially movable in rear guiding sleeve in the retracted position of the tool. The front shank of the carrier is rotatable in a front guiding sleeve, and the workpiece is placed between the two sleeves so that the front shank extends through its bore prior to start of the bore enlargement operation. The distance between the cutter and the front end of the front shank of the carrier exceeds the length of the bore in the workpiece.

4 Claims, 3 Drawing Figures

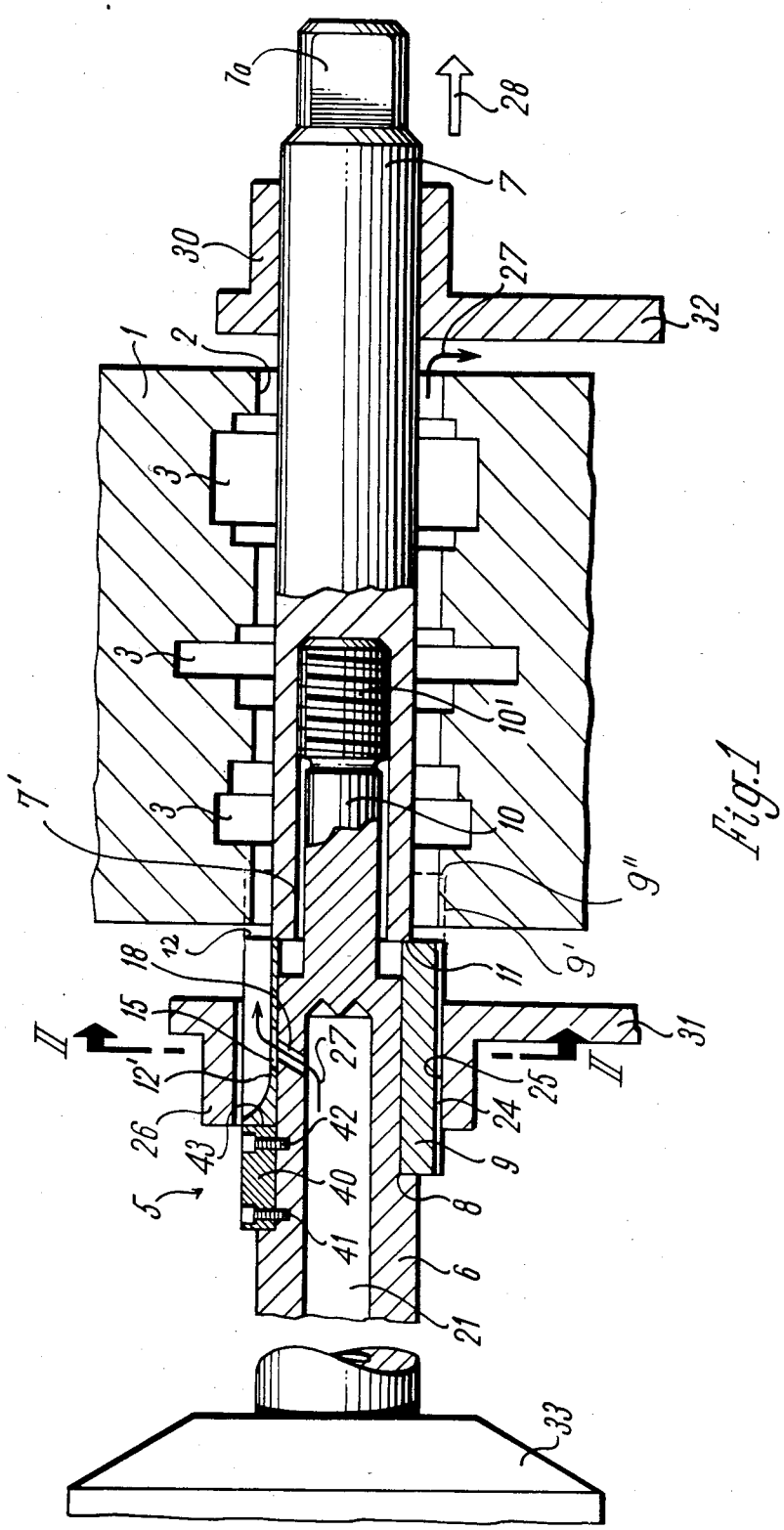

REBORING TOOL

BACKGROUND OF THE INVENTION

The present invention relates to a boring tool, particularly to a reboring tool for enlarging the bores of workpieces.

East Germany Pat. No. 154,072 discloses such a reboring tool, comprising a cutter, carried by a carrier, said cutter having cutting-edges at its forward face end and said carrier being composed of two shanks, wherein said cutter is received at an intermediate portion, at which both shanks are joined. The first shank is of smaller diameter and extends through the bore, which is to be enlarged, whilst the first shank and certain guiding rulers of the cutter are received in guiding sleeves, between which the workpiece is held. The second shank is of the BTA (British Trepanning Association) type, which means that it is formed by two tubes, of which the first one has a smaller diameter and is placed within the second one such that a certain space is obtained between both tubes. At the joinder of this second shank, which has the double-tube structure, with the cutter, there are first openings to connect the space between the tubes with the bore and second openings to connect the bore with the interior of the inner tube. The space between both tubes is used to supply a lubricant and cooling medium to the boring spot, whilst to the interior of the inner tube the fluid is carried back, taking with it the shavings and chips, which are taken off the bore during the boring operation. In order to guarantee this flow of the medium, which is necessarily associated with that type of tool, the workpiece is closely held between both guiding sleeves, because any space between the workpiece and the sleeve, would allow the medium to leave through the same and thereby would be detrimental to the proper functioning of this type of tool. Additionally, the structure disclosed in said East German patent has the disadvantage that the shavings or chips, removed by the cutting edges of the cutter during boring operation, tend to be collected and clog in the space between the first shank and the bore, through which the first shank extends; that is for the reason mentioned, namely that no flow through this space can be allowed, because it would not be feasible with this type of boring process or tool.

Another drawback of the patented tool is its complexity. The drilling head is secured to the outer pipe of the shank by a bayonet lock and the coupling pin which establishes the connection between the pilot and the shank is threadedly connected with the drilling head. Thus, the drilling head is disposed between the threads of the coupling pin and the bayonet lock and, consequently, is called upon to take up all of the mechanical stresses which arise in the connection between the pilot and the shank. The connection between the shank and the pilot must be very strong in order to warrant the provision of spaced guiding sleeves for the pilot and the shank, i.e., to prevent undue flexing of the tool between such guiding sleeves.

OBJECTS AND SUMMARY OF THE INVENTION

An object of the invention is to provide an improved boring tool, where such clogging of chips and shavings in the space between the first mentioned shank or guiding means and the bore, which is to be enlarged, is absolutely avoided.

Another object of the invention is a provision of a reboring tool as mentioned, which operates in the way of a typical "one-lip deep hole boring tool", i.e. a tool with only one channel extending through said second shank for supply of pressurized medium, with which the pressurized medium is led off from the boring spot through the space between the outer circumference of the shank and the bore. It is an additional object of the present invention to provide a reboring tool, wherein the cutter is mounted on its carrier in a novel and improved way, so that it is readily separable from the carrier as well as it is held against actual movement relative to the carrier.

A further object of the invention is to provide novel and improved means for transmitting the rotational movement from the carrier to the cutter. It is an ancillary object of the invention to provide a novel and improved arrangement of drill bushes for the carrier and the cutter of the improved reboring tool.

It is still another object of the invention, to provide a reboring tool of the one-lip-type, as it is described above, which can be used to enlarge bores in such a manner that the deviation of the axis of the enlarged bore from an ideally linearily extending line is reduced, as by improved guidance of the shank, i.e. to use the advantages, which are shown in the described East German patent for BTA-type boring tools, in a different type of tool, which only is provided with one interior channel.

It is a still further object of the invention to provide a reboring tool, which can be furnished with a wide variety of cutters and wherein the replacement of a first cutter with a different or identical second cutter takes up little time and can be carried out by semiskilled or unskilled persons.

It is a still further object of the invention to provide a reboring tool, which is especially suited for high-precision treatment of workpieces, especially workpieces in which borings have to be enlarged, which already are provided with certain recesses or circumferential grooves, as it is the case with housings of hydraulic valves or the like.

The invention is embodied in a boring tool, which comprises a rotatably driven carrier including coaxial first and second threadedly connected separate rotary shanks. The first shank, which is located ahead of the second shank (considered in the direction of feeding movement of the tool), is of smaller diameter and is taken up in a first guiding sleeve for being held against any deviation of its axis during the boring process. The second sleeve is provided with only one axial channel for supply of the pressurized lubricant and cooling fluid medium to the boring spot during the boring operation through openings, which are provided at the intermediate portion, at which the first and the second shank are threadedly connected and at which the cutter is held on the carrier. The fluid medium is then led away from the boring spot through the space between the first shank, which extends through the to be enlarged bore, and the outer periphery of said bore. This is made possible by the fact that the type of shank configuration described allows that the workpiece is held between the sleeves and a certain spaced relation to the first sleeve such that the medium may leave the space between the first shank and bore freely without any clogging or other type of unwanted collection or accumulation of chips or shavings form the boring operation.

BRIEF DESCRIPTION OF THE DRAWING

FIG. 1 is a partly elevational and partly axial sectional view of a boring tool which embodies the invention, the carrier being shown in the retracted position and the first shank of the carrier extending through the bore of a metallic workpiece preparatory to penetration of the cutting edges of the cutter into the material of such workpiece;

DESCRIPTION OF THE PREFERRED EMBODIMENTS

Figure 3:
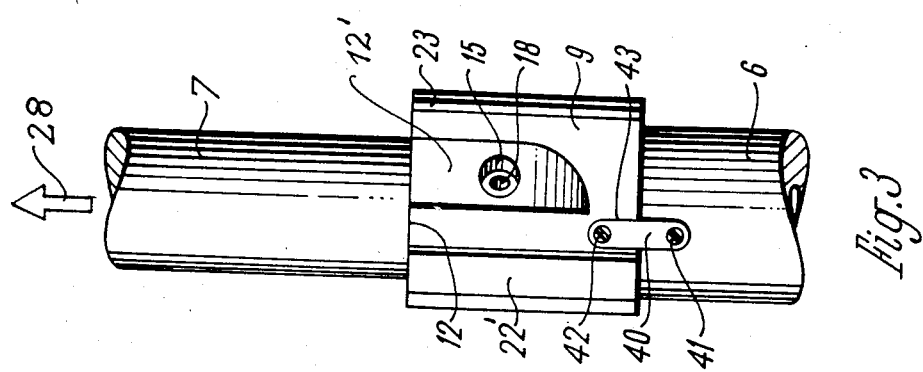
FIG. 3 is a fragmentary plan view as seen in the direction of arrow III in FIG. 2, with the rear sleeve and its support omitted.
Figure 2:
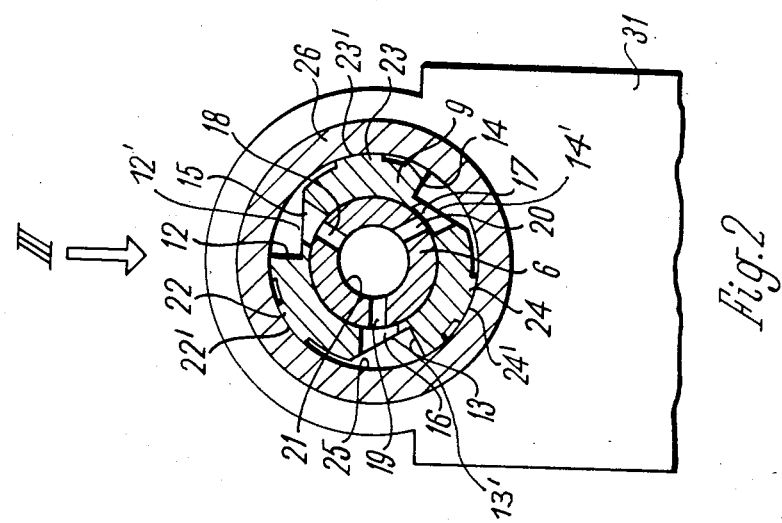
FIG. 2 is a transverse sectional view as seen in the direction of arrows from the line II—II of FIG. 1.

Referring to the drawing in detail, the improved reboring tool 5 comprises a two-piece carrier including a first or front cylindrical shank 7 and a second or rear cylindrical shank 6 whose diameter exceeds that of the front shank 7 and which includes a smaller-diameter forwardly extending mandrel 10 having external threads 10' in mesh with the internal threads provided in the innermost portion of a tapped blind bore 7' extending forwardly from the rear end face 11 of the shank 7. The front shank 7 extends through the bore 2 of a metallic workpiece 1 which is disposed between two spaced-apart sleeves (drill bushes) 26 and 30. The illustrated workpiece 1 has a bore 2 which includes several enlarged annular portions or recesses 3 of different axial length. The maximum diameters of the recesses 3 may but need not be identical. The purpose of the drilling tool 5 is to enlarge the smallest-diameter portion of the bore 2 in the workpiece 1, e.g. by a minute fraction of one millimeter (such as by a few tenths of one millimeter). The tool 5 should enlarge the diameter of the bore 2 with utmost accuracy and the axes of all sections of such bore should coincide without any or with negligible deviation from the ideal axis. Moreover, the surface surrounding the bore 2 (namely, of those portions of the bore which extend between the recesses 3 and which are outwardly adjacent to the two outermost recesses in the workpiece) should be round, i.e., the deviation of such surface from an ideal round surface should be minimal. Further, it is a requirement that the deviation between the axis of the bore 2 from its ideal, i.e. exactly linear direction, shall be practically zero. Any type of bending or flexing of the drilling tool during operation, which would result in not exactly linear bores, should be avoided. This is extremely important with very long or deep bores of the type shown in FIG. 1, which may be provided in the housings of hydraulic valves, etc.

The front shank 7 of the two-piece carrier constitutes an elongated rod-shaped guide or pilot for an annular cutter 9 which surrounds the carrier and whose front end face abuts against the rear end face 11 (abutment) of the shank 7. The rear end face of the cutter 9 engages a second abutment in the form of a forwardly facing external annular shoulder 8 of the rear shank 6. The shoulder 8 is disposed between the maximum-diameter rearmost portion and th medium-diameter median portion of the shank 6, and such median portion is disposed between the rearmost portion and the mandrel 10 of the shank 6. The shoulder 8 cooperates with the end face 11 of the front shank or pilot 7 to prevent axial movements of the cutter 9 relative to the two-piece carrier. However, the cutter 9 can be readily removed from the tool 5 by the simple expedient of unscrewing the mandrel 10 from the blind bore 7'. To this end, the front end portion of the shank 7 is provided with flats (as at 7a) so as to facilitate engagement by the jaws of a suitable torque transmitting tool not shown.

The cutter 9 is provided with a set of three equidistant radially extending cutting edges 12,13 and 14 which are formed by removing material from the peripheral surface of the cutter. The cutting edges 12-14 are portions of cutter 9, which cut into the material 1 as the tool 5 with cutter 9 moves from left (retracted position) to right (extended position) in FIG. 1. Thus, the cutting edges 12-14 basically extend radially outwardly at the front face end of cutter 9. The surfaces 12' are cut into the cutter 9 to form the cutting edges 12,13,14, respectively formed with openings 15,16 and 17, and these openings respectively communicate with smaller-diameter radial openings 18,19 and 20, which are machined into the median portion of the rear shank 6 and are in communication with the axially extending channel 21, through which a pressurized liquid medium serving as lubricant and coolant is admitted to the cutting area of the cutting edges 12 to 14. The manner in which such medium is admitted into the range of cutting edges 12 to 14 is similar to that known in connection with the so-called one-lip drilling process.

It may be mentioned in this context that, typically, a one-lip deep hole drilling tool, also known as a gun drill, is formed by a cutter carrying shank with a medium supply channel in its interior and a groove at its outside surface. Cutting is effected by one edge at the forward front face of the tool. The medium supplied through the channel to the cutting surface cools the front surface at the forward front end of the bore and takes away the shavings or chips through the groove.

Typical one-lip deep holedrilling tools are shown in U.S. Pat. Nos. 3,054,308 and 4,092,083. Basically, the tool in accordance to the present invention is of this type, but it is of special configuration in that shank 7 is extending in forward direction of the cutter 9 and the medium is led away from the cutting edge through the clearance between bore 2 and shank 7 in forward direction.

The cutter 9 is further formed with three axially extending guiding rulers 22,23,24 which alternate with cut-in surfaces 12' to 14', as considered in the circumferential direction of the cutter, and have sectionally spherical guiding surfaces 22', 23'24' whose centers of curvature are located on the axis of shank 6. The cylindrical internal surface of the sleeve 26 is shown at 25; such surface is contacted by the surfaces 22'-24' in the position of the tool 5 as shown in FIG. 1, as well as while the tool begins to advance in the direction of arrow 28 (feeding movement), while cutting edges 12-14 begin to cut out a larger diameter of bore 2 in the workpiece 1. As the cutting progresses and the tool moves rightward in FIG. 1, the guiding surfaces 22'-24' contact the cylindrical outer surface surrounding the enlarged portion of the bore 2. Therefore, the tool 5 is guided with a very high degree of accuracy and, at the same time, the workpiece 1 is centered and held against radial or other stray movements while the reaming operation progresses. An intermediate position of the cutter 9 is indicated by broken lines, as at 9'. The cutting area, i.e. the area where cutting edges 12-14 cut into bore 2 to enlarge the diameter, is indicated at 9''.

The coolant which is admitted via passage 21 of the rear shank 6 flows through the openings 18–20, thereupon through the registering openings 15–17, into the cutouts formed by surfaces 12'–14', and through the bore 2 of the workpiece 1 to issue at the right-hand end of the workpiece and to thereby remove shavings or chips and/or otherwise configurated fragments of removed metallic material. The direction of flow of coolant in the shank 6 and in the bore 2 is indicated by the arrows 27.

The direction of forward movement of the carrier including the shanks 6 and 7 is indicated by the arrow 28.

The front portion of the smaller-diameter shank 7 ist rotatably and axially movably guided in the front guiding sleeve 30 which is integral with or removably connected to a support 32. A similar support 31 is provided for the rear guiding sleeve 26. These supports are installed in the frame of the machine which employs the improved tool. The provision of two axially spaced-apart sleeves 26 and 30 for the carrier 6,7 constitutes a highly advantageous feature of the improved tool. Thus, the surface surrounding the bore in the front guiding sleeve 30 can guide the shank 7 at all times with a very high degree of accuracy. The surface 25 surrounding the bore in the rear guiding sleeve 26 guides the guiding surfaces 22'–24' of the rulers 22–24 of the cutter 9 when the carrier 6,7 is held in the retracted position of FIG. 1 as well as during the initial stage of movement of the carrier toward its extended position. The cutter 9 moves forwardly (arrow 28) and beyond the surface 25 of the rear sleeve 26 when the surfaces 22'–24' are already properly confined in the enlarged portion of the bore 2 in the workpiece 1 so that the carrier 6,7 is then held against flexing because it is engaged and centered by the workpiece 1 as well as by the front sleeve 30. It will be noted that the cutter 9 is not mounted at the front end of its carrier but rather at a considerable distance from such front end at an intermediate portion, at which shanks 6,7 are connected. The just mentioned distance exceeds the length of the bore 2 in the workpiece. Such mounting of the cutter 9 and the provision of two sleeves for the carrier ensures that the tool 5 can treat workpieces with a surprisingly high degree of precision as to the linearity of the axis of bore 2.

FIG. 1 further shows a holder 33, which holds the rear shank 6 of the carrier 9. For rotational movement such holder is also mounted in the frame of the machine.

FIGS. 1 and 3 show a device which transmits torque from the driven rear shank 6 of the carrier to the cutter 9 in such a way that the torque transmitting connection between the carrier and the cutter can be readily interrupted preparatory to removal of the cutter, i.e., upon separation of the front shank 7 from the rear shank 6. The torque transmitting device comprises an elongated tongue 40 which is detachably affixed to the shank 6 by screws 41,42 or other suitable fasteners and a portion (e.g., one-half) of which extends into an axially parallel groove 43 machined into the rear portion of the cutter 9 between two neighboring cutting edges.

It is clear that the illustrated tongue 40 constitutes but one form of means for transmitting torque from the carrier 6,7 to the cutter 9. For example, fasteners can be employed to separably secure the cutter 9 directly to the shank 6.

The rear end face 11 of the front shank 7 and the shoulder 8 of the rear shank 6 constitute but one form of abutments for fixing the cutter 9 in axial position at a desired distance from the front end of the carrier. For example, the mandrel 10 can carry rings or screws which serve to urge the cutter 9 to a selected axial position at such distance from the front sleeve 30 that a workpiece 1 can be readily inserted between the sleeves 26,30 when the tool 5 is fully retracted to a position in which the flats 7a of the shank 7 are located in or very close to the sleeve 26.

An important advantage of the improved boring tool is that the cutter 9 can be replaced with little loss in time and that a properly mounted cutter is held against axial and/or angular movement relative to its carrier 6,7 in a simple but highly effective way. Moreover, the tool 5 including the shanks 6,7 and the cutter 9 is highly resistant to flexing or bending stresses.

Another important advantage of the improved tool is that it can be used for the enlarging of holes with a very high degree of precision. This is due (at least in part) to the fact that the carrier 6,7 and the centering portions 22 to 24 of the cutter 9 are guided by two discrete sleeves 26,30 which are spaced apart from one another in such a way that they provide room for the placing of a workpiece 1 therebetween. It has been found that such mounting of the parts 6,7 and 9 effectively prevents any appreciable radial stray movements of the cutter and thus ensures the making of holes or bores the axes of which extends almost absolutely linearly in forward direction. It was further found that the improved tool is especially suitable for reboring of workpieces 1 of the type shown in FIG. 1, i.e., wherein the bore 2 has one or more enlarged portions or recesses 3 so that, in the absence of the front sleeve 30, the cutter 9 could not invariably ensure adequate centering of the tool, especially if the axial length of one or more recesses 3 exceeds the axial length of the cutter.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptions should and are intended to be comprehended within the meaning and range of equivalence of the appended claims.

I claim:

1. A boring tool, particularly a reboring tool for enlarging the bores of workpieces, comprising a rotatably driven carrier including coaxial first and second threadedly connected sparable rotary shanks movable axially between retracted and extended positions, said first shank being located ahead of said second shank, as considered in the direction of axial movement of said shanks to said extended position, and said first and second shanks respectively having spaced-apart first and second abutments which face each other; the second shank being provided with an interior channel for supply of a lubricant and cooling fluid medium through openings at the forward end of the shank to the boring area; said first shank extending through the bore in the workpiece to be enlarged and said first shank further having such a diameter to allow passage of the said fluid medium through the space between the first shank and the bore such as to allow the fluid to leave the space at the end of the bore which is opposite to the one, at which the cutter is positioned at the beginnung of the reboring process; an annular cutter surrounding said carrier and disposed between and contacting said abutments, cutting edges at its front face end and further having centering means; a first sleeve rotatably and axially movably receiving said first shank; and a second sleeve rotatably and axially movably receiving said centering means in the retracted positions of said shanks, said sleeves being spaced apart from one another so as to provide room for a workpiece therebetween whereby the first shank extends through the bore of such workpiece in the retracted positions of said shanks and the cutting edges begin to penetrate into the bore of the workpiece in response to movement of said shanks from said retracted positions, the first sleeve being placed at such a distance from the workpiece that the said fluid medium can leave the bore in the workpiece at the end of the bore, which is neighboring the first sleeve.

2. The boring tool of claim 1, wherein said second shank has a forwardly extending smaller-diameter externally threaded mandrel and said first shank has a tapped blind bore receiving said mandrel.

3. The boring tool of claim 2, wherein said first shank has an annular rear end face constituting said first abutment and said second shank has an external shoulder facing said end face and constituting said second abutment.

4. The boring tool of claim 1, further comprising means for transmitting torque from said carrier to said cutter.

* * * * *